(12) United States Patent
Albertelli et al.

(10) Patent No.: US 10,850,147 B2
(45) Date of Patent: Dec. 1, 2020

(54) FLAME RETARDANT MATRIX

(71) Applicants: Aldino Albertelli, Cork (IE); Michael Frieh, Cork (IE)

(72) Inventors: Aldino Albertelli, Cork (IE); Michael Frieh, Cork (IE)

(73) Assignee: Acell Industries Limited, Cork (IE)

( * ) Notice: Subject to any disclaimer, the term of this patent is extended or adjusted under 35 U.S.C. 154(b) by 0 days.

(21) Appl. No.: 15/751,509

(22) PCT Filed: Aug. 10, 2016

(86) PCT No.: PCT/GB2016/052492
§ 371 (c)(1),
(2) Date: Feb. 9, 2018

(87) PCT Pub. No.: WO2017/025750
PCT Pub. Date: Feb. 16, 2017

(65) Prior Publication Data
US 2018/0230291 A1 Aug. 16, 2018

(30) Foreign Application Priority Data
Aug. 10, 2015 (GB) .................... 1514107.0

(51) Int. Cl.
*A62D 1/06* (2006.01)
*C08K 5/00* (2006.01)
(Continued)

(52) U.S. Cl.
CPC .............. *A62D 1/06* (2013.01); *C08K 5/0066* (2013.01); *C08K 5/23* (2013.01); *C08K 5/31* (2013.01);
(Continued)

(58) Field of Classification Search
CPC .......... A61D 1/06; C09K 21/06; C09K 21/10; C09K 21/14; C08K 5/0066; C08K 5/23;
(Continued)

(56) References Cited

U.S. PATENT DOCUMENTS 3,826,764 A * 7/1974 Weber ................. A62D 1/00
521/121
4,123,587 A * 10/1978 Wesch ................. C08J 3/226
241/21

(Continued)

FOREIGN PATENT DOCUMENTS

EP 0222298 5/1987
EP 0794164 9/1997
(Continued)

OTHER PUBLICATIONS

English machine translation of Tsuchiya et al. JP 10-266403 A. (Year: 1998).*

(Continued)

*Primary Examiner* — Matthew R Diaz
(74) *Attorney, Agent, or Firm* — Ryan T. Grace; Advent, LLP

(57) ABSTRACT

The present invention relates to fire retardant compositions, and fire retardant objects formed therefrom comprising a preformed gas-producing material and a matrix, wherein, in use, the gas-producing material prevents, limits or reduces combustion of the matrix. Also disclosed are methods of producing fire retardant compositions, methods of making objects formed therefrom as well as structures having fire retardant properties.

25 Claims, 3 Drawing Sheets

(51) Int. Cl.
- *C08K 5/23* (2006.01)
- *C08K 5/31* (2006.01)
- *C08K 5/3415* (2006.01)
- *C09K 21/10* (2006.01)
- *C08L 23/06* (2006.01)
- *C08L 27/10* (2006.01)
- *C08L 61/04* (2006.01)
- *C08L 75/04* (2006.01)
- *C08L 79/08* (2006.01)
- *C08L 95/00* (2006.01)

(52) U.S. Cl.
CPC ............ *C08K 5/3415* (2013.01); *C08L 23/06* (2013.01); *C08L 27/10* (2013.01); *C08L 61/04* (2013.01); *C08L 75/04* (2013.01); *C08L 79/08* (2013.01); *C08L 95/00* (2013.01); *C09K 21/10* (2013.01); *C08L 2201/02* (2013.01)

(58) Field of Classification Search
CPC ...... C08K 5/31; C08K 5/3472; C08K 5/3415; C08L 23/06; C08L 27/10; C08L 61/04; C08L 75/04; C08L 79/08; C08L 95/00; C08L 2201/02; C06B 23/003; C06B 23/02
USPC .................. 252/4, 5, 6, 6.5, 7, 601, 604, 609
See application file for complete search history.

(56) References Cited

U.S. PATENT DOCUMENTS

| | | | |
|---|---|---|---|
| 4,871,477 A * | 10/1989 | Dimanshteyn | A62D 1/0007 252/609 |
| 4,999,383 A * | 3/1991 | Blount | C08K 3/38 521/103 |
| 5,831,209 A | 11/1998 | Kozyrev et al. | |
| 6,217,788 B1 * | 4/2001 | Wucherer | A62C 5/006 149/17 |
| 7,601,426 B1 | 10/2009 | Wilson et al. | |
| 2005/0282018 A1 * | 12/2005 | Van Den Bergen | B32B 17/10706 428/426 |
| 2011/0027500 A1 * | 2/2011 | Hanna | A62C 2/06 428/12 |
| 2014/0041882 A1 * | 2/2014 | Van Der Jagt | A62D 1/06 169/84 |
| 2014/0352988 A1 * | 12/2014 | Aldino | A62C 35/08 169/48 |
| 2015/0284638 A1 * | 10/2015 | Xu | E04B 1/80 428/317.9 |

FOREIGN PATENT DOCUMENTS

| | | | |
|---|---|---|---|
| EP | 0804946 | 11/1997 | |
| GB | 2498654 A * | 7/2013 | ............ A62C 35/08 |
| JP | 10266403 A * | 10/1998 | |
| WO | 2012112037 | 8/2012 | |
| WO | WO-2014067262 A1 * | 5/2014 | ............... E04B 1/80 |

OTHER PUBLICATIONS

GB Search Report dated Feb. 5, 2016.
International Search Report dated Oct. 20, 2016.

* cited by examiner

FLAME RETARDANT MATRIX

The present invention relates to fire retardant compositions, and fire retardant objects formed therefrom comprising a preformed gas-producing material and a matrix, wherein, in use, the gas-producing material prevents, limits or reduces combustion of the matrix. Also disclosed are methods of producing fire retardant compositions, methods of making objects formed therefrom as well as structures having fire retardant properties.

It is known that fires can be controlled through passive fire protection and active fire protection.

Passive fire protection can be incorporated into structures, such as being built into the wall of a building so as to minimise spread of fire through the building, as well as the impact of the fire on the structural integrity of the building. For instance to reduce the likelihood of fire spreading, a building may be compartmentalised using fire resistant walls and doors. Structural steel may be coated with a material to prevent the steel from reaching temperatures at which it starts to soften.

In addition, the walls, floor, ceiling and/or inner furnishings within a building, such as carpets, chair coverings and partitions, may comprise flammable materials. These materials can be treated with fire retardant coatings to prevent or delay them catching fire. Fire retardant coatings work in a number of different ways depending on the coating used. For instance, the coatings may form a protective layer to prevent the volatilisation of the flammable material. Alternatively, the coatings may comprise materials which react to produce $CO_2$ and/or $H_2O$, so as to dilute or cool the nearby flame. In a further alternative, the coating may char upon exposure to heat so as to form a protective coating. Finally, the coating may comprise free radical agents, most commonly bromide or chloride free radicals, in order to capture highly oxidising free radicals produced during combustion, the presence of which are required in order for the flame to propagate. However, treating flammable materials in this way may cause, for example, the physical properties of the materials, such as hand feel, strength and colour to be altered, and there if of course a significant capital expenditure in needing to include processes and materials for such coatings.

Alternatively, flammable materials, such as for walls, floor, ceiling and/or inner furnishings, may be replaced with a natural fire retardant material, such as wool or leather, or a synthetic fire retardant material, such as acrylic, polyester or polyvinyl chloride. However, there are a limited number of materials which do not require further fire retardant coatings so that they meet the required safety standards, and in some cases, these materials may not be appropriate (due to load requirements and/or cost) or aesthetically desirable for their intended use.

Passive fire protection has the advantage that it does not rely on any external factors to be effective. However, passive fire protection is typically aimed at isolating fire outbreaks and limiting the extent to which a fire spreads throughout a building but is not designed to actively suppress or extinguish a fire.

Active fire protection, however, does rely on external factors to be effective, such as human input or a trigger. Hand-held fire extinguishers are an example of active fire protection. Generally, hand-held fire extinguishers contain a propellant and a fire suppressing agent. Fire suppressing agents include water; dry chemicals such as monoammonium phosphate, sodium bicarbonate, potassium bicarbonate and potassium chloride; carbon dioxide; foams such as aqueous film forming foam (AFFF), alcohol-resistant aqueous film forming foams (AR-AFFF) and compressed air foam systems (CAFS); wet chemical materials such as potassium acetate, potassium carbonate and potassium citrate; and Halon gas. Halon gas has now been banned from use in Europe due to its adverse effects on both humans and the environment.

Hand-held fire extinguishers have the disadvantage that they generally require a person to be in close proximity to the naked flames which may compromise personal safety. For water-, dry chemical-and Halon-based fire extinguishers, the horizontal range is typically between 3 and 50 ft. Fire extinguishers which have higher ranges require much heavier canisters between 75 and 350 lbs. Such fire extinguishers are transported on wheels and so are not easily maneuvered in the event of a fire.

Sprinklers (both water and gas) are a further example of active fire protection. When a certain temperature is reached around a sprinkler, a thermal-sensor activates the sprinkler to deploy water or gas. Depending on the type of sprinkler, the temperature at which the thermal-sensor activates the sprinkler can vary from 38° C. to 330° C. A disadvantage of sprinklers is that they require a relatively large infrastructure to function. For example, sprinklers need to be connected to a water or gas supply which, in itself, may require large storage areas, for example in a specially designated basement area. A further problem with sprinklers is that a lag time, which can be of up to two minutes, between activation of the sprinkler and water or gas deployment leads to the loss of valuable time for supressing a fire.

It will also be appreciated that such known systems, especially those which require the use of propellants and are therefore stored under high pressure, must be inspected regularly with pressure gauges and systems being checked for readiness and other issues such as corrosion.

Yet a further problem associated with well-known systems is that the fire suppressing materials can cause serious damage to documents, equipment and goods as well as potentially the building itself. Given that such systems are routinely fitted in shops and offices they can leave premises unusable for many days after use, for example, as a result of water damage.

Accordingly, there is a need in the art to provide a system which aims to reduce or alleviate one or more of the issues currently faced, particularly a passive form of fire protection which can reduce the possibility of flammable materials catching fire and can be retrofitted into pre-existing constructions.

Whilst it is known that fires can be controlled by using gas-producing materials which burn to produce aerosol products with an extinguishing effect, such known gas-producing materials have the disadvantage that, on combustion, they emit unwanted by-products which may be damaging to human health. Such by-products may not be present in the uncombusted material but form and are emitted on combustion due to the high temperatures that develop as a result of the exothermic reactions taking place in the material. When a gas-producing material is used to control a fire in a small space, such as an office or a car, high concentrations of unwanted by-products can rapidly build-up. This has limited the quantity of gas-producing material that may be used to control a fire in small spaces, and especially those where humans or animals are present.

A typical unwanted by-product generated by known gas-producing materials is hydrogen cyanide. In the case of hydrogen cyanide, inhalation by humans at concentrations of 150 mg/m$^3$ can cause death within 30 minutes, at concentrations of 200 mg/m$^3$ can cause death within 10 minutes, and at concentrations of 300 mg/m$^3$ can cause immediate death. The current legal limit in the UK for gaseous hydrogen cyanide concentration is 55 mg/m$^3$.

Other by-products that may be generated include: carbon monoxide, nitrogen dioxide, oxygen, sulphur dioxide, hydrogen sulphide, ammonia, naphthalene, acenaphthylene, acenaphthene, fluorine, phenanthrene, anthracene, fluoranthene, pyrene, benzoanthracenes, chrysene, benzofluoranthenes, benzopyrenes, perylene, indenopyrenes, dibenzanthracenes and benzoperylenes.

In order to increase the potential uses for such gas-producing charges, and to allow for greater quantities of gas producing materials to be used to control a fire in a confined space, the emission of unwanted by-products, such as hydrogen cyanide, must be minimised.

In particular, the present invention provides a fire retardant composition comprising a gas-producing material, which seeks to produce less cyanide during use.

An additional issue which such materials is that the reactions that occur are highly exothermic, and therefore their use to date has required the provision of strong, heat-resistant metal boxes, see for example 'Practice of Use of Aerosol Extinguishing Agents by Combustion of Propellants', Baratov et al, International Association for Fire Safety Science.

According to a first aspect of the present invention, there is provided a fire retardant composition comprising a preformed gas-producing material admixed with a matrix, wherein the preformed gas-producing material comprises:
a) a comminuted foamed polymer;
b) a nitrogen containing fuel; and
c) an oxidiser.

As noted above, the gas-producing material is admixed and preferably dispersed within/throughout the matrix. This has surprisingly allowed for the production of a product, such as a polymeric product which possesses fire resistant properties, and is believed to be due to the production of fire suppressing gas when the dispersed gas-producing material contained therein is activated, for example by a flame. The fire supressing gas (although in a relatively small amount as it is dispersed throughout the matrix) prevents or reduces combustion of the matrix, which forms the product. In this way, the use of the present fire retardant composition for manufacturing, for example a wall, ceiling or floor panel, furniture item or roof tile, can prevent or reduce the degradation of said wall, ceiling or floor panel, furniture item or roof tile, and therefore prevent or reduce damage sustained, during the event of a fire.

The gas-producing materials of the present invention have also been found to produce less cyanide than known gas-producing materials. Without wishing to be bound by any theory, it is believed that this effect is due to the use of a comminuted foamed polymer, rather than an unfoamed polymer, in the gas-producing materials of the invention. A higher temperature of combustion has been observed upon combustion of the gas-producing materials of the present invention, as compared to known gas-producing materials (for example the gas producing materials used in the present invention have been demonstrated to produce temperature of 1000 to 1300° C., in contrast to 800° C.).

In addition, the gas-producing materials of the present invention have been found to burn more consistently, with the avoidance of extreme reactions such as localised explosions. Without wishing to be bound by any theory, it is believed that the use of a pre-cured comminuted resinous material avoids issues caused by partial curing of resinous materials contained in traditional materials. Pre-curing also allows for better control of water content of the present invention, as curing of resinous materials can lead to the formation of significant amounts of water as a by-product.

In some embodiments, the comminuted foamed polymer, forming part of the gas-producing material, is preferably a substantially rigid, self-supporting foamed polymer which is resistant to deflection under load and does not collapse under moderate pressure. Foamed polymers which are particularly suitable for use in the gas producing material of the present invention have a density in the range of 100 to 500 kg·m$^{-3}$, more preferably 120 to 400 kg·m$^{-3}$, and most preferably 120 to 250 kg·m$^{-3}$, exclusive of any aggregate chips that may be embedded in the substrate.

In addition, the comminuted foamed polymer may have tensile strength in the range of 80 to 100 N/m$^2$.

Furthermore, the comminuted foamed polymer used in the present invention may be an open-cell foam or a closed-cell foam. Preferably, the foamed polymer is an open-cell foam.

In some embodiments of the present invention, the foamed polymer is preferably selected from phenolic resin foams, polystyrene foams, polyurethane foams, polyvinyl-chloride foams, polyester foams, polyether foams and foam rubber.

In particular, the comminuted foamed polymer is a cured foam polymer, preferably a thermosetting polymer, such as a phenolic resin foam.

The foamed polymer used in the fire retardant material of the present invention may be formed by a curing reaction between:
a) a liquid resole; and
b) an acid hardener for the resole.

An insoluble particulate solid is preferably also present in the curing reaction.

For example, a particularly suitable foam may be produced by way of a curing reaction between:
(a) a liquid phenolic resole having a reactivity number (as defined below) of at least 1; and
(b) a strong acid hardener for the resole; optionally in the presence of:
(c) a finely divided inert and insoluble particulate solid which is present, where used, in an amount of 5% to 200% by weight of the liquid resole and is substantially uniformly dispersed through the mixture containing resole and hardener;
the temperature of the mixture containing resole and hardener due to applied heat not exceeding 85° C. and the said temperature and the concentration of the acid hardener being such that compounds generated as by-products of the curing reaction are volatilised within the mixture before the mixture sets such that a foamed phenolic resin product is produced.

By a phenolic resole, it is meant a solution in a suitable solvent of an acid-curable prepolymer composition prepared by condensation of at least one phenolic compound with at least one aldehyde, usually in the presence of an alkaline catalyst such as sodium hydroxide.

Examples of phenols that may be employed are phenol itself and substituted, usually alkyl substituted, derivatives thereof, with the condition that that the three positions on the phenolic benzene ring ortho- and para- to the phenolic hydroxyl group are unsubstituted. Mixtures of such phenols may also be used. Mixtures of one or more than one of such phenols with substituted phenols in which one of the ortho- or para-positions has been substituted may also be employed where an improvement in the flow characteristics of the resole is required. However, in this case the degree of cross-linking of the cured phenolic resin foam will be reduced. Phenol itself is generally preferred as the phenol component for economic reasons.

The aldehyde will generally be formaldehyde although the use of higher molecular weight aldehydes is not excluded.

The phenol/aldehyde condensation product component of the resole is suitably formed by reaction of the phenol with at least 1 mole of formaldehyde per mole of the phenol, the formaldehyde being generally provided as a solution in water, e.g. as formalin. It is preferred to use a molar ratio of formaldehyde to phenol of at least 1.25 to 1 but ratios above 2.5 to 1 are preferably avoided. The most preferred range is 1.4 to 2.0 to 1.

The mixture may also contain a compound having two active hydrogen atoms (dihydric compound) that will react with the phenol/aldehyde reaction product of the resole during the curing step to reduce the density of cross-linking. Preferred dihydric compounds are diols, especially alkylene diols or diols in which the chain of atoms between the hydroxy groups contains not only methylene and/or alkyl-substituted methylene groups but also one or more heteroatoms, especially oxygen atoms. Suitable diols include ethylene glycol, propylene glycol, propane-1,3-diol, butane-1, 4-diol and neopentyl glycol. Particularly preferred diols are poly-, especially di-(alkylene ether) diols, for example diethylene glycol and, especially, dipropylene glycol.

Preferably the dihydric compound is present in an amount of from 0 to 35% by weight, more preferably 0 to 25% by weight, based on the weight of phenol/aldehyde condensation product. Most preferably, the dihydric compound, when used, is present in an amount of from 5 to 15% by weight based on the weight of phenol/aldehyde condensation product. When such resoles containing dihydric compounds are employed in the present process, products having a particularly good combination of physical properties, especially strength, can be obtained.

Suitably, the dihydric compound is added to the formed resole and preferably has 2 to 6 atoms between hydroxy groups.

The resole may comprise a solution of the phenol/aldehyde reaction product in water or in any other suitable solvent or in a solvent mixture, which may or may not include water.

Where water is used as the sole solvent, it is preferably present in an amount of from 15 to 35% by weight of the resole, preferably 20 to 30%. Of course the water content may be substantially less if it is used in conjunction with a cosolvent, e.g. an alcohol or one of the above-mentioned dihydric compounds where used.

As indicated above, the liquid resole (i.e. the solution of phenol/aldehyde product optionally containing dihydric compound) must have a reactivity number of at least 1. The reactivity number is 10/x where x is the time in minutes required to harden the resole using 10% by weight of the resole of a 66 to 67% aqueous solution of p-toluene sulfonic acid at 60° C. The test involves mixing about 5 mL of the resole with the stated amount of the p-toluene sulfonic acid solution in a test tube, immersing the test tube in a water bath heated to 60° C. and measuring the time required for the mixture to become hard to the touch. The resole should have a reactivity number of at least 1 for useful foamed products to be produced and preferably the resole has a reactivity number of at least 5, most preferably at least 10.

The pH of the resole, which is generally alkaline, is preferably adjusted to about 7, if necessary, for use in the process, suitably by the addition of a weak organic acid such as lactic acid.

Examples of strong acid hardeners are inorganic acids such as hydrochloric acid, sulphuric acid and phosphoric acid, and strong organic acids such as aromatic sulphonic acids, e.g. toluene sulphonic acids, and trichloroacetic acid.

Weak acids such as acetic acid and propionic acid are generally not suitable.

The preferred hardeners for the process of the invention are the aromatic sulfonic acids, especially toluene sulfonic acids. The acid may be used as a solution in a suitable solvent such as water.

When the mixture of resole, hardener and solid is to be poured, e.g. into a mould and in slush moulding applications, the amount of inert solid that can be added to the resole and hardener is determined by the viscosity of the mixture of resole and hardener in the absence of the solid. For these applications, it is preferred that the hardener is provided in a form, e.g. solution, such that when mixed with the resole in the required amount yields a liquid having an apparent viscosity not exceeding about 50 poises at the temperature at which the mixture is to be used, and the preferred range is 5 to 20 poises. Below 5 poises, the amount of solvent present tends to present difficulties during the curing reaction.

The curing reaction is exothermic and will therefore of itself cause the temperature of the mixture containing resole and acid hardener to increase. The temperature of the mixture may also be raised by applied heat, but the temperature to which said mixture may then be raised (that is, excluding the effect of any exotherm) preferably does not exceed 85° C. If the temperature of the mixture exceeds 85° C. before addition of the hardener, it is usually difficult or impossible thereafter to properly disperse the hardener through the mixture because of incipient curing. On the other hand, it is difficult, if not impossible, to uniformly heat the mixture above 85° C. after addition of the hardener.

Increasing the temperature towards 85° C. tends to lead to coarseness and non-uniformity of the texture of the foam but this can be offset at least to some extent at moderate temperatures by reducing the concentration of hardener. However at temperatures much above 75° C. even the minimum amount of hardener required to cause the composition to set is generally too much to avoid these disadvantages. Thus, temperatures above 75° C. are preferably avoided and preferred temperatures for most applications are from ambient temperature to about 75° C. The preferred temperature range usually depends to some extent on the nature of the particulate solid, where used. For most solids the preferred temperature range is from 25 to 65° C., but for some solids, in particular wood flour and grain flour, the preferred temperature range is 25 to 75° C. The most preferred temperature range is 30 to 50° C. Temperatures below ambient, e.g. down to 10° C. can be used if desired, but no advantage is usually gained thereby. In general, at temperatures up to 75° C., increase in temperature leads to decrease in the density of the foam and vice versa.

The amount of hardener present also affects the nature of the product as well as the rate of hardening. Thus, increasing the amount of hardener not only has the effect of reducing the time required to harden the composition, but above a certain level dependant on the temperature and nature of the resole it also tends to produce a less uniform cell structure. It also tends to increase the density of the foam because of the increase in the rate of hardening. In fact, if too high a concentration of hardener is used, the rate of hardening may be so rapid that no foaming occurs at all and under some conditions the reaction can become explosive because of the build-up of gas inside a hardened shell of resin. The appropriate amount of hardener will depend primarily on the temperature of the mixture of resole and hardener prior to the commencement of the exothermic curing reaction and the reactivity number of the resole and will vary inversely with the chosen temperature and the reactivity number. The preferred range of hardener concentration is the equivalent of 2 to 20 parts by weight of p-toluene sulfonic acid per 100 parts by weight of phenol/aldehyde reaction product in the resole, assuming that the resole has a substantially neutral reaction, i.e. a pH of about 7. By equivalent to p-toluene sulfonic acid, we mean the amount of hardener required to give substantially the same curing time as the stated amount of p-toluene sulfonic acid. The most suitable amount for any given temperature and combination of resole and finely divided solid is readily determinable by simple experiment. Where the preferred temperature range is 25 to 75° C. and the resole has a reactivity number of at least 10, the best results are generally obtained with the use of hardener in amounts equivalent to 3 to 10 parts of p-toluene sulfonic acid per 100 parts by weight of the phenol/aldehyde reaction product. For use with temperatures below 25° C. or resoles having a reactivity number below 10, it may be necessary to use more hardener.

By suitable control of the temperature and of the hardener concentration, the time lapse between adding the hardener to the resole and the composition becoming hard (referred to herein as the curing time) can be varied at will from a few seconds to up to an hour or even more, without substantially affecting the density and cell structure of the product.

Another factor that controls the amount of hardener required can be the nature of the inert solid, where present. Very few are exactly neutral and if the solid has an alkaline reaction, even if only very slight, more hardener may be required because of the tendency of the filler to neutralize it. It is therefore to be understood that the preferred values for hardener concentration given above do not take into account any such effect of the solid. Any adjustment required because of the nature of the solid will depend on the amount of solid used and can be determined by simple experiment.

The exothermic curing reaction of the resole and acid hardener leads to the formation of by-products, particularly aldehyde and water, which are at least partially volatilised.

The curing reaction is preferably effected in the presence of a finely divided inert and insoluble particulate solid which is substantially uniformly dispersed throughout the mixture of resole and hardener. By an inert solid we mean that in the quantity it is used it does not prevent the curing reaction.

It is believed that the finely divided particulate solid provides nuclei for the gas bubbles formed by the volatilisation of the small molecules, primarily formaldehyde and/or water, present in the resole and/or generated by the curing action, and provides sites at which bubble formation is promoted, thereby assisting uniformity of pore size. The presence of the finely divided solid may also promote stabilisation of the individual bubbles and reduce the tendency of bubbles to agglomerate and eventually cause likelihood of bubble collapse prior to cure. To achieve the desired effect, the solid should be present in an amount of 5% to 200% by weight, preferably 5 to 100% by weight based on the weight of the resole.

Any finely divided particulate solid that is insoluble in the reaction mixture is suitable, provided it is inert. Examples of suitable particulate solids are provided below, and may also include alumina.

Solids having more than a slightly alkaline reaction, e.g. silicates and carbonates of alkali metals, are preferably avoided because of their tendency to react with the acid hardener. Solids such as talc, however, which have a very mild alkaline reaction, in some cases because of contamination with more strongly alkaline materials such as magnesite, are acceptable.

Some materials, especially fibrous materials such as wood flour, can be absorbent and it may therefore be necessary to use generally larger amounts of these materials than non-fibrous materials, to achieve valuable foamed products.

The solids preferably have a particle size in the range 0.5 to 800 microns. If the particle size is too great, the cell structure of the foam tends to become undesirably coarse. On the other hand, at very small particle sizes, the foams obtained tend to be rather dense. The preferred range is 1 to 100 microns, most preferably 2 to 40 microns. Uniformity of cell structure appears to be encouraged by uniformity of particle size. Mixtures of solids may be used if desired.

If desired, solids such as finely divided metal powders may be included which contribute to the volume of gas or vapour generated during the process. If used alone, however, it will be understood that the residues they leave after the gas by decomposition or chemical reaction satisfy the requirements of the inert and insoluble finely divided particulate solid required by the process of the invention.

Preferably, the finely divided solid has a density that is not greatly different from that of the resole, so as to reduce the possibility of the finely divided solid tending to accumulate towards the bottom of the mixture after mixing.

One preferred class of solids is hydraulic cements, e.g. gypsum and plaster, but not Portland cement because of its alkalinity. These solids will tend to react with water present in the reaction mixture to produce a hardened skeletal structure within the cured resin product. Moreover, the reaction with the water is also exothermic and assists in the foaming and curing reaction. Foamed products obtained using these materials have particularly valuable physical properties.

Moreover, when exposed to flame even for long periods of time they tend to char to a brick-like consistency that is still strong and capable of supporting loads. The products also have excellent thermal insulation and energy absorption properties. The preferred amount of inert particulate solid is from 20 to 200 parts by weight per 100 parts by weight of resole.

Another class of solids that is preferred because its use yields products having properties similar to those obtained using hydraulic cements comprises talc and/or fly ash. The preferred amounts of the solid is also 20 to 200 parts by weight per 100 parts by weight of resole, or when a combination of talc and fly ash is used, the total weight of the solid is 20 to 200 parts by weight per 100 parts by weight of the resole.

For the above classes of solid, the most preferred range is 50 to 150 parts per 100 parts of resole.

In general, the maximum amount of solid that can be employed is controlled only by the physical problem of incorporating it into the mixture and handling the mixture. In general it is desired that the mixture is pourable but even at quite high solids concentrations, when the mixture is like a dough or paste and cannot be poured, foamed products with valuable properties can be obtained.

Other additives may be included in the foam-forming mixture. These may include: (i) surfactants, such as anionic materials, e.g. sodium salts of long chain alkyl benzene sulfonic acids, non-ionic materials such as those based on poly(ethylene oxide) or copolymers thereof, and cationic materials such as long chain quaternary ammonium compounds or those based on polyacrylamides; (ii) viscosity modifiers such as alkyl cellulose, especially methyl cellulose; and (iii) colorants, such as dyes or pigments. Plasticisers for phenolic resins may also be included provided the curing and foaming reactions are not suppressed thereby, and polyfunctional compounds other than the dihydric compounds referred to above may be included which take part in the cross-linking reaction which occurs in curing; e.g. di-or poly-amines, di-or poly-isocyanates, di-or poly-carboxylic acids and aminoalcohols. Polymerisable unsaturated compounds may also be included, possibly together with free-radical polymerisation initiators that are activated during the curing reaction, e.g. acrylic monomers, so-called urethane acrylates, styrene, maleic acid and derivatives thereof, and mixtures thereof. The foam-forming compositions may also contain dehydrators, if desired.

Other resins may be included e.g. as prepolymers which are cured during the foaming and curing reaction or as powders, emulsions or dispersions. Examples are polyacetals such as polyvinyl acetals, vinyl polymers, olefin polymers, polyesters, acrylic polymers and styrene polymers, polyurethanes and prepolymers thereof and polyester prepolymers, as well as melamine resins, phenolic novolaks, etc. Conventional blowing agents may also be included to enhance the foaming reaction, e.g. low boiling organic compounds or compounds which decompose or react to produce gases.

Preferably, the comminuted foamed polymer is used in particulate form. The average particle size of the comminuted foamed polymer preferably falls within the range of 1 to 200 μm, such as 10 to 150 μm, and preferably 25 to 100 μm for forming the gas-producing material.

The comminuted foamed polymer may be added in an amount of up to 40%, typically 5 to 35%, by total weight of the comminuted foamed polymer, the nitrogen-containing fuel and the oxidiser forming the gas-producing material. In certain embodiments, the comminuted foamed polymer is present in an amount of 8 to 20%, more preferably 11 to 17%, and still more preferably 13 to 15%, by total weight of the comminuted foamed polymer, the nitrogen-containing fuel and the oxidiser.

The nitrogen-containing fuel may be selected from guanidine salts, triazoles and tetrazoles, and azo-compounds. Suitable guanidine salts or derivatives may be selected from cyanoguanidine, aminoguanidine, aminoguanidine nitrate, guanidine nitrate, triaminoguanidine nitrate, diaminoguanidine nitrate and ethylenebis-(aminoguanidinium)dinitrate. Suitable triazoles and tetrazoles include unsubstituted tetrazole and 5-aminotetrazole. Suitable azo-compounds include azodicarbonate and azodicarbonamide.

The nitrogen-containing fuel is preferably a guanidine salt or derivative thereof, and most preferably cyanoguanidine. Advantageously, guanidine salts or derivatives thereof act as a binder for the gas-producing material used in the present invention, as well as having the function of a fuel.

The nitrogen-containing fuel is presently used in particulate form. The average particle size of the nitrogen-containing fuel preferably falls within the range of 5 to 150 μm, such as 10 to 80 μm, and preferably 20 to 50 μm.

The nitrogen-containing fuel may be added in an amount of up to 50%, typically of 5 to 45%, by total weight of the comminuted foamed polymer, the nitrogen-containing fuel and the oxidiser. In certain embodiments, the nitrogen-containing fuel is present in an amount of 19 to 29%, more preferably 21 to 27%, and still more preferably of 23 to 25%, by total weight of the comminuted foamed polymer, the nitrogen-containing fuel and the oxidiser.

The oxidiser may be selected from alkali metal nitrates, perchlorates or carbonates. The alkali metal in the oxidiser will generally be sodium or potassium. The oxidiser may be potassium nitrate or potassium carbonate, and is preferably potassium nitrate. The use of potassium nitrate is preferred as its combustion temperature (approximately 150° C.)—i.e. the temperature at which it will start burning—is much lower than potassium carbonate (approximately 300° C.).

Preferably, the oxidiser is used in the form of particles. The average particle size of the oxidiser preferably falls within the range of 1 to 100 μm, preferably 5 to 50 μm, more preferably 15 to 30 μm.

The oxidiser may be added in an amount of up to 80%, typically of 30 to 75%, by total weight of the comminuted foamed polymer, the nitrogen-containing fuel and the oxidiser. In certain embodiments, the oxidiser is present in an amount of 40 to 69%, more preferably 50 to 66%, and still more preferably of 60 to 64%, by total weight of the comminuted foamed polymer, the nitrogen-containing fuel and the oxidiser.

It will be understood that the particle size of the materials can be produced and controlled using methods well known in the art. By way of example, the comminuted foamed polymer, nitrogen-containing fuel and oxidiser can be ground to the desired size using, for example a ball mill.

For the avoidance of doubt, it will be appreciated that each of the components of the gas producing material, i.e. the comminuted foamed polymer, the nitrogen-containing fuel and the oxidiser, are different compounds. Thus, a single compound cannot correspond to more than one of these components.

The gas producing material may further comprise water so as to form a paste of the gas producing material. The water will generally be added in an amount of from 1 to 100%, preferably 5 to 50%, and more preferably 10 to 30%, by total weight of the comminuted foamed polymer, the nitrogen-containing fuel and the oxidiser. More water than is desired in the gas-producing material may be added during formation of the gas-producing material, as water can assist with binding of the components.

In addition to the main components of the gas-producing material (i.e. the comminuted foamed polymer, the nitrogen-containing fuel and the oxidiser), the gas-producing material may comprise further components such as binders, oxide-based catalysts, burn rate modifiers, flame inhibition chemicals, anti-detonation components and/or additional oxidizing agents. However, in certain instances, it is preferred that the gas-producing material consists only of the comminuted foamed polymer (e.g. a comminuted phenolic resin foam), the nitrogen-containing fuel (e.g. a guanidine salt or derivative), the oxidiser (e.g. a sodium or potassium nitrate or carbonate) and water.

It will be appreciated that minor amounts of other binders may also be present, such as water-soluble organic binders. Suitable binders include guar gums, polyvinylpyrrolidone, polyacrylonitrile, polyvinylalcohol and water-soluble cellulose. Such other binders are generally used in an amount of up to 15%, such as from 0.1 to 15%, for instance from 1 to 5%, by total weight of the comminuted foamed polymer, the nitrogen-containing fuel and the oxidiser.

Suitable burn rate modifiers include powdered metals or their corresponding alloys, oxides, salts or complexes. Examples of such modifiers include, for example aluminium, bismuth, calcium, copper, hafnium, iron, magnesium, strontium, tin, titanium, tungsten, zinc and zirconium. As noted above also included are their respective oxides, salts and complexes. The burn rate modifiers may be used individually, or in combination with one or more other burn rate modifiers. Potassium chromate, potassium dichromate, ammonium chromate and ammonium dichromate may also be used as burn rate modifiers and may be applied in the form of an aqueous solution to the surface of the oxidiser. The burn rate modifier may be present in amounts of up to 2%, such as from 0.1 to 2%, for instance from 0.5 to 1.5%, by total weight of the comminuted foamed polymer, the nitrogen-containing fuel and the oxidiser.

The gas-producing materials may also comprise an oxide-based catalyst comprising at least two members selected from the elements of Groups I, IV, V, VI, VII and VIII in the periodic table, such as cobalt molybdate or lead molybdate. Other useful oxide-based catalysts include salts of Li, Na, K, Rb, Cs, Ag, Cu, Sn, Pb, V, As, Sb, Bi, Fe or Ni of molybdic acid, chromic acid and/or tungstic acid. The oxide-based catalyst may be used in an amount of up to 20%, such as from 0.1 to 20%, for instance from 5 to 15%, by total weight of the comminuted foamed polymer, the nitrogen-containing fuel and the oxidiser.

Suitable flame inhibition chemicals include potassium chloride and monoammonium phosphate compounds. Such compounds may be present in amounts of up to 15%, such as from 0.1 to 15%, for instance from 5 to 10%, by total weight of the comminuted foamed polymer, the nitrogen-containing fuel and the oxidiser.

An anti-detonation component can also be used to prevent unwanted combustion of the gas-producing material. Suitable anti-detonation components include bentonite, alumina, silica, and diatomaceous earth. These components may be used in an amount of up to 20%, such as from 0.1 to 20%, for instance from 5 to 15%, by total weight of the comminuted foamed polymer, the nitrogen-containing fuel and the oxidiser.

The further components in total may be present in the gas-producing material in an amount of up to 40%, preferably up to 30% and more preferably up to 20%, by total weight of the comminuted foamed polymer, the nitrogen-containing fuel and the oxidiser.

In a preferred embodiment, the preformed gas-producing material comprises a comminuted foamed polymer, nitrogen-containing fuel and an oxidiser in amounts of:
  comminuted foamed polymer—5 to 35% by weight;
  nitrogen-containing fuel—5 to 45% by weight; and
  oxidiser—30 to 75% by weight.

A gas-producing material for use in the present invention is formed by combining at least the comminuted foamed polymer, the nitrogen-containing fuel and the oxidiser.

In one embodiment, the comminuted foamed polymer, nitrogen-containing fuel and oxidiser are mixed, preferably until a homogenous distribution of the materials is formed. It is preferable that all three materials be present in particulate form.

The comminuted foamed polymer, nitrogen-containing fuel and oxidiser may be combined to form the gas-producing material by any known means, such as the use of a blade mixer. The compounds may be combined in one step, or two of the components may be combined and subsequently added to the third. For instance, the nitrogen-containing fuel and the oxidiser may be combined, and then added to the comminuted foamed polymer. A binder is then added to the mixture in order to agglomerate the materials. Suitable binders include water soluble organic binders, such as guar gums, polyvinylpyrrolidone, polyacrylonitrile, polyvinylalcohol and water-soluble cellulose.

Alternatively, the gas producing material is formed through the extrusion or moulding of a mixture of the comminuted foamed polymer, nitrogen-containing fuel and oxidiser, into the desired shape. In some embodiments, the gas-producing material may then be formed into particles. As a further alternative, large blocks of the gas producing material can be formed, for example through an extrusion or moulding processes, as discussed above, and the resulting block of material ground down to produce particles of the required size.

The size of the gas producing material produced may be selected dependent on the concentration of the material to be used and/or the flammability of the matrix material.

The gas producing material can be in the form of a powder, wherein the gas producing material has a particle size of less than 5 mm, preferably less than 1 mm. For example, the particle size can be between 10 and 500 μm.

In some embodiments, the preformed gas-producing material is admixed with the matrix whilst the matrix is still in liquid form; after which the mixture is subsequently cooled and shaped as desired. The term "liquid" as used in the present invention is considered to encompass both materials which are able to flow freely and materials having a softened surface, such as a semi-cured polymeric material (for example SMC).

The gas producing material may be admixed with the matrix in amounts of up to 85% by weight of the matrix, preferably 25 to 75%. Amounts of from 35 to 65% may also be used, including 45 to 55%.

The matrix used in the present invention may, in principle, be any polymeric material. The term polymer as used in the present invention is considered to encompass both polymers and co-polymers. In some embodiments, the polymer matrix is a combination of two or more polymers.

Preferably the polymer matrix used in the present invention may be selected from polymethylene, polyethylene, phenolic, polypropylene, polystyrene, polycarbonate, cyclic olefin copolymers (COC), polyurethane, polyolefin, latex polymers, polyvinyl chloride, polybenzimidazole, polybenzoxazole, polybenzthiazole, polysialate, acrylate polymers such as polymethyl methacrylate, polyethylene terephthalate, thermoplastic polymers such as polyether ether ketone (PEEK), polyether ketone (PEK) and polyether sulfone (PES), and fluoropolymers.

The matrix used in the present invention may include materials which form unfoamed products.

Accordingly, the polymer matrix can be selected from any of the foamed polymer resins disclosed in relation to the comminuted foamed polymer of the preformed gas-producing material, such as phenolic resin foams, polystyrene foams, polyurethane foams, polyvinylchloride foams, polyester foams, polyether foams and foam rubber.

In one preferred embodiment, the polymer matrix used in the present invention is polyurethane.

In some embodiments of the present invention, a suitable polyurethane polymer matrix is formed by reacting at least one isocyanate and at least one polyol, wherein the reaction is performed at a temperature between 20 and 150° C., preferably between 100 and 150° C. In a preferred embodiment, the reaction mixture further comprises a basic catalyst; such as sodium hydroxide, sodium acetate or an amine catalyst, preferably the catalyst is selected from a tertiary amine.

The at least one polyol used to produce a polyurethane matrix may be selected from a polyether, polyester or a compound comprising a hydrocarbon back-bone, such as castor oil. In particular, the polyol of the present invention is selected from poly(oxypropylene glycol), poly(oxytetramethylene glycol), poly(ethylene adipate) and aliphatic hydrocarbons.

The at least one isocyanate used to produce a polyurethane matrix may be selected from diisocyanate, oligomeric isocyanate or polyisocyanate. A particularly preferred diisocyanate being methylene bis diphenylisocyanate (MDI). Particularly preferred polyisocyanates are hexamethylene diisocyanate and hydrogenated MDI (HMDI).

In a preferred embodiment of the present invention, one or more of the selected isocyanoate(s) may further comprise an amine functional group, wherein the amine functional group is selected from an alkanoamine, an alkoxylated amine, a Mannich polymer or a combination thereof.

In another preferred embodiment of the present invention, the matrix may include one or more of a thermosetting polymer, for example an epoxy resin, a phenolic resin, a bismaleimide or polyimide, and/or any other suitable material. Suitable phenolic foam resins include those described above with respect to the comminuted foam material.

In a further preferred embodiment of the present invention, the polymer matrix comprises a sheet-form material, such as a sheet moulding compound (SMC). The SMC includes a thermosetting resin, for example a polyester resin, vinyl ester or epoxy resin together with reinforcing fibres, for example glass fibres.

In another embodiment of the present invention, the matrix is selected from a hydrocarbon based material, such as bitumen. Suitable compositions include those used to make bitumen/asphalt roofing tiles and membranes.

It is well known to use bituminous compositions for manufacturing waterproofing membranes, which are usually used as roof coverings and roofing underlay sheets. Such materials may be manufactured using a reinforcement carrier support sheet comprising a fabric such as polyester, and optionally glass fibres, or a combination of both, and then saturating and/or coating the front and back sides of the carrier with a modified bituminous coating material. Suitable coating materials may be based on atactic polypropylene (APP), amorphous poly alpha olefin (APAO), thermoplastic polyolefin (TPO), styrene-butadiene-styrene (SBS), styrene-ethylene-butadiene-styrene (SEBS), synthetic rubber or other asphaltic modifiers, that will enhance the properties of asphalt.

Such roofing membranes may be used in commercial, industrial and residential applications.

There are generally two well-known classifications of modified bitumen roofing materials: (1) cap sheet and (2) base sheet. Shingle roofing materials, however, are used primarily in residential applications, and are exposed to the elements, and hence can be considered as 'cap' as well.

A cap sheet or shingle membrane can be modified using APP, APAO, TPO, SBS, SEBS, synthetic rubber or other asphaltic modifiers, and is generally reinforced with a polyester carrier or a combination of polyester and fibreglass. These sheets can be smooth or granular surfaced and are typically greater than 2.8 mm in thickness. The top surface of the cap sheet is exposed to the elements and hence the name "cap".

A base sheet is typically modified using any of the same modifiers as a cap sheet, but due to economic considerations, is modified using smaller quantities of less expensive polymers such as APP or SBS. A base sheet is generally reinforced with a fibreglass carrier (which again costs significantly less than polyester) and is smooth surfaced. The thickness of such base sheet typically ranges from 1.0 mm to 2.5 mm depending upon the properties required. In use, the base sheet is typically first applied to the roof deck using mechanical fasteners, via hot mopping or using cold application techniques.

Cap sheets or shingles are applied on top of the base sheets. Most APP-modified bitumen membranes are torch-applied, i.e., by heating the back-side of the sheet to melt the compound and using the molten compound to form a heat weld. Most SBS-modified bitumen membranes are set using hot mopping asphalt, torch-applied or adhered with cold-process adhesives, such as described in U.S. Pat. No. 5,807,911.

The manufacture of bituminous roofing material with multiple layers is well known, and in this regard, reference is made to U.S. Pat. Nos. 2,893,889; 4,755,409; and 4,871,605; as well as EP Patent 903435.

Roofing underlayment materials are used in roofing systems such as modified bituminous roofing membranes as well as shingles, tiles, slates, cedar and metal roofing. The most commonly used underlayment is asphalt-saturated roofing felt, commonly known as No. 15, No. 30 or No. 50 felt. Roofing felt is made from a base sheet made of paper coated with filler-modified asphalt and as such is very inexpensive.

For the compositions of the present inventions, the matrix may comprise or consist of a fire retardant polymer. Preferably, the fire retardant polymer is selected from polyethylene, polyimide, polyurethane, polybenzimidazole, polybenzoxazole, polybenzthiazole, polysialate and/or a brominated polymer. In particular, the polymer may comprise or consist of one or more fire retardant polymer(s) selected from tetrakis (hydroxymethyl) phosphonium chloride (THPC), N-methylol dimethylphosphonopropionamide (MDPA), tetrabromobisphenol, penta-, octa- and deca-brominated diphenyl ether (oxide).

A particularly suitable matrix is a solid open-cell phenolic resin foam, wherein the phenolic foam is produced as discussed above.

In some embodiments, the matrix may further comprise additives, such as fire retardant compounds, hardeners, accelerators, fillers and/or pigments. Examples of fire retardant compounds include bismuth, antimony, antimony trioxide, chlorinated parafins, phosphoric acid esters, gypsum, polyphosphoric acid ammonium, magnesium hydroxide, aluminium hydroxide and zinc borates. Such fire suppressant compounds are generally used in amounts of 0.1 to 15%, for example 1 to 5%, of the total weight of the matrix.

Examples of hardeners include ketamines, enamines, oxazolidines, amines, melamines, diamines, benzoates, peroxides, silanes, carbonamide, monoazide, polyazide and amides. It would be obvious to a person of skill in the art which hardener would be suitable for use with the polymers disclosed above, as shown in, for example, "Handbook of Sealant Technology", edited by K. L. Mittal, A. Pizzi, page 345, section 13.3.2.3.3 "Latent Hardeners". Such hardeners are generally used in amounts of 0.1 to 15%, for example 1 to 5%, of the total weight of the matrix.

For embodiments in which fillers are added to the matrix, the fillers may be organic or inorganic (including metallic), and crystalline or amorphous. Even fibrous solids have been found to be effective, although not preferred. Examples include clays, clay minerals, alumina, talc, vermiculite, metal oxides, refractories, solid or hollow glass microspheres, fly ash, coal dust, wood flour, grain flour, nut shell flour, silica, mineral fibres such as finely chopped glass fibre and finely divided asbestos, chopped fibres, finely chopped natural or synthetic fibres, ground plastics and resins whether in the form of powder or fibres, e.g. reclaimed waste plastics and resins, pigments such as powdered paint and carbon black, and starches. Such fillers are generally used in amounts of 0.1 to 15%, for example 1 to 5%, of the total weight of the matrix.

Examples of accelerators include copper octoate, dimethyl aniline, Morpholin-4-yl morpholine-4-carbodithioate and 2-(Morpholinodithio)benzothiazole. Such accelerators are generally used in amounts of 0.1 to 15%, for example 1 to 5%, of the total weight of the matrix.

Examples of pigments include powdered paint or carbon black. Such pigments are generally used in amounts of 0.1 to 15%, for example 1 to 5%, of the total weight of the matrix.

In a further embodiment, the matrix may comprise reinforcing layers to provide additional strength, rigidity and/or pressure-resistant capacity to the fire retardant compositions.

By way of example, the matrix may comprise one or more layers of such fibres so as to provide additional strength and/or rigidity to the structure formed therefrom.

The fibres may include one or more material(s). For example the fibres may include one or more of carbon fibres, glass fibres, aramid fibres and/or polyethylene fibres, such as ultra-high molecular weight polyethylene (UHMWPE). In one preferred embodiment, the reinforcement comprises or consists of glass fibres, for example E-glass fibres or S-glass fibres.

The reinforcing fibres may be short fibres, for example having lengths of 5.0 cm or less, or may be longer fibres. The fibres may be loose, for example, the fibres may be arranged in a uni-or multi-directional manner. The fibres may be part of a network, for example woven or knitted together in any appropriate manner.

The arrangement of the fibres may be random or regular, and may comprise a fabric, mat, felt or woven or other arrangement. Fibres may provide a continuous filament winding. Optionally, more than one layer of fibres may be provided.

In some embodiments, the matrix is first heated so as to form a liquid and the preformed gas-producing material is subsequently admixed or dispersed throughout the liquid matrix. In another embodiment, the preformed gas-producing material first admixed with the matrix, wherein the matrix may be in the form of a solid particulate, the mixture may then be heated until the matrix is in liquid form. In some embodiments, after incorporating the gas-producing material, reinforcing fibers may further be added to the liquid matrix.

In this way, there is provided a method of forming a fire retardant material comprising the steps of:
(i) providing a preformed gas-producing material;
(ii) providing a matrix in liquid state; and
(iii) admixing the preformed gas-producing material and liquid matrix.

The gas-producing material may be mixed with the liquid matrix so as to form a generally homogeneous distribution of the gas-producing material throughout the liquid matrix. Any known method may be used to produce the general homogeneous distribution, such as high-shear mixing.

The length of time required to produce a generally homogeneous distribution of the gas-producing material is dependent on, amongst other things, the amount of gas-producing material added, the viscosity of the liquid matrix and the method of mixing used. In general, a substantially homogeneous distribution of the gas-producing material can be formed within 5 minutes to 2 days, preferably within 10 minutes to 1 day, more preferably within 15 minutes to 10 hours.

In addition, further additives may be added to the liquid matrix before the mixing step. As discussed above, the further additives may be selected from fire suppressant compounds, hardeners, accelerators, fillers and/or pigments.

Once mixed, the material may be shaped into the desired form using techniques such as moulding, extrusion and/or casting, which techniques are well known to those of skill in the art.

In other embodiments, wherein the gas producing material is admixed or dispersed throughout the liquid resole of a foamed polymer resin, such as a polyurethane resin or a phenolic resin resole, the material can then be cured in order to produce the open- or closed-cell foam.

In another embodiment, a fire retardant composition in accordance with the present invention may be prepared by a method comprising the steps of:
(i) applying the preformed gas-producing material to the surface of a mould;
(ii) applying a layer of the matrix material to the mould so as to cover the gas-producing material; and
(iii) producing (for example by pressing) a composition comprising a polymer matrix material having preformed gas-producing material concentrated on one side of the polymer matrix.

Such a method tends to produce a fire retardant material having a matrix material comprising a higher concentration of gas-producing material on the outer surface of the matrix. It will be appreciated by those of skill in the art that the process steps could also be applied in reverse.

Alternatively, a fire retardant material in accordance with the present invention may be prepared by the method comprising the steps of:
(i) applying the preformed gas-producing material to the surface of a mould;
(ii) applying a layer of matrix material to the mould so as to cover the preformed gas-producing material;
(iii) applying a further layer of preformed gas-producing material on top of the matrix layer; and
(iv) producing (for example by pressing) a composition comprising a matrix material having gas-producing material concentrated on both sides of the matrix.

According to a further aspect of the present invention, there is provided a fire retardant composite comprising a substrate bonded to a layer of polymeric material, such as SMC, and further comprising a gas-producing material which is admixed with the polymeric material and/or the substrate.

In preferred embodiments the gas-producing material comprises:
a) a comminuted foamed polymer;
b) a nitrogen containing fuel; and
c) an oxidiser;
such as described above.

In particular, the substrate may comprise a foamed or unfoamed polymer, as discussed above. Preferably, the substrate comprises a phenolic foam resin such as described above. Where the gas producing material is present within the substrate, it is preferably contained within the matrix of the substrate. Preferably, the substrate comprises a homogeneous distribution of the gas producing material throughout the substrate.

In some embodiments, the substrate further comprises surface formations for keying with the polymeric material. This can improve the bond between the substrate and the polymeric material layer. It is preferred for the bonding to occur without the need for an additional adhesive. Alternatively, the polymeric material may be bonded to the substrate through the use of an adhesive. Examples of possible suitable adhesives include, but are not limited to natural rubber, synthetic polyisoprene, butyl rubber, halogenated butyl rubber, polybutadiene, styrene-butadiene rubber, nitrile rubber, hydrogenated nitrile rubber, chloroprene rubber, silicone rubber, and halogenated silicone rubber.

In a preferred embodiment, the substrate comprises an open-cell foam which allows for the polymeric material to flow therein.

In addition, the substrate and/or polymeric material may further comprise reinforcing fibers.

In some embodiments, the present invention can be combined with the teaching if WO 2013/108042 (the content of which is incorporated by reference herein). In particular, it is possible to produce panels where not only if the material used fire resistant, but panels comprising a fire extinguishing charge.

In particular, a fire retardant composite in accordance with one aspect of the present invention may be prepared by the method comprising the steps of:
  (i) applying a gas-producing material to the surface of a mould;
  (ii) applying a layer of sheet-form polymeric material to the mould so as to cover the gas-producing material;
  (iii) applying a substrate on top of the sheet-form polymeric material; and
  (iv) applying force to the layers so as to produce a composition comprising a polymeric material having gas-producing material on the external surface.

It will be appreciated by those of skill in the art that the above process steps can be performed in reverse order.

The fire retardant composite produced by the above mentioned method generally comprises a polymeric material comprising a higher concentration of gas-producing material at an external surface of the polymer matrix.

Alternatively, a fire retardant composite of the present invention can be prepared by the method comprising the steps of:
  (i) applying a sheet-form polymeric material layer to the surface of a mould;
  (ii) applying the gas-producing material on top of the polymeric material layer;
  (iii) applying a substrate on top of the gas-producing material; and
  (iv) applying force to the layers so as to produce a composition comprising gas-producing material positioned between the polymeric material layer and the substrate.

It will be appreciated that the resulting fire retardant composite will comprise a higher concentration of gas-producing material at the surface of the polymer matrix layer adjacent to the substrate. Again, similar to other embodiments disclosed herein, it will be understood that the order of the steps disclosed may be performed in reverse order.

In a yet a further alternative, the fire retardant composite of the present invention may be prepared by the method comprising the steps of:
  (i) applying the gas-producing material to the surface of a mould;
  (ii) applying a layer of polymeric material to the mould so as to cover the gas-producing material;
  (iii) applying a further layer of gas-producing material on top of the sheet form material;
  (iv) applying a substrate on top of the gas producing material; and
  (v) applying force to the layers so as to produce a composition comprising a polymeric material layer having gas-producing material around its periphery.

In another embodiment, the gas producing material is also present within the matrix of the substrate. Preferably, the substrate comprises a foamed or unfoamed polymer, wherein the gas producing material is admixed with the liquid polymer resole before curing.

In order to ensure a uniform distribution of the gas producing charge throughout the substrate, the gas producing material and liquid polymeric resole of the substrate are preferably mixed for between 5 minutes and 2 days, preferably between 10 minutes and 1 day, more preferably between 15 minutes and 10 hours, such as described above.

The mixing of the gas producing material and liquid resole of the substrate can be performed by any well known method in the art, such as high shear mixing.

In one embodiment of the present invention, a fire retardant composition of the present invention may be prepared by the method comprising the steps of:
  (i) applying a layer of polymeric material to the surface of a mould;
  (ii) applying a substrate containing the gas producing material within the matrix of the substrate on top of the sheet-form polymer matrix; and
  (iii) applying force to the layers so as to produce a composition comprising a sheet-form polymer matrix bonded to a substrate containing gas-producing material.

Similar to other embodiments, it will again be appreciated that the order of the steps may be altered.

In accordance with the disclosures of the present inventions, there is also disclosed a method of producing a fire retardant composition comprising the steps of:
  (i) providing a preformed gas-producing material such as described above;
  (ii) providing a polymeric material, such as described above, in liquid state;
  (iii) admixing the preformed gas-producing material and liquid polymeric material; and
  (iv) forming the mixture into a structure such as a sheet or pellet.

It will be appreciated that the mixture, once formed, can be further processed so as to produce the desired final product.

The methods of the present invention may include the step of applying a layer comprising a mesh, veil, fabric or other material between the gas-producing material and the matrix layer. In addition to adding strength to any formed product, the layer may also aid in reducing the movement of gas-producing material during a processing step.

Preferably any such layer is porous to matrix material so that the matrix material can flow through the layer and around the gas-producing material.

In one preferred embodiment, during a process step such as pressing, matrix material may pass into the open cells or other formations contained within an open-cell substrate material providing a mechanical bond between the substrate and the polymer matrix. This can reduce the risk of delamination of the matrix material from the substrate, provide a stable product when exposed to heating/cooling cycles and provides a monolithic composite structure without the need for an adhesive to be applied or the pre-assembly of individual parts.

In preferred embodiments, the substrate is such that gas or vapour can escape from a pressing region during the pressing step. Air trapped in the mould cavity and gases formed during the during reaction need to be released during the moulding operation. Preferably the pressing region is that area where the surface of the substrate and the polymer matrix material are being pressed together, preferably in the region of the interface of the substrate and the material.

By removing gas or vapour that might otherwise remain and/or build up in that region, the pressure required to form the composite product can be significantly reduced in some examples. Preferably at least part of the surface of the material is porous to allow for the displacement of gas or vapour from the relevant areas. Preferably the substrate is such that gas or vapour can escape from the pressing region in a direction having at least a component in a direction generally transverse to the pressing direction in which the polymer matrix material is pressed to the substrate.

By releasing the pressure from the mould lower pressures may be used. This allows for aluminium tools to be used. This can give rise to low cost tooling, flexible production and less downtime due to tool change over in view of the reduced weight of an aluminium mould and speed of heating or cooling an aluminium mould compared with a stainless steel mould. For example, the volume of an aluminium tool could be significantly smaller than that of a corresponding tool of steel, and this combined with the lower density of aluminium leads to considerable weight advantages when using aluminium moulds.

Fire retardant materials in accordance with the present inventions have particular applicability in buildings where it is advantageous for sections of the structural framework, such as walls, ceilings panels, floor panels, inner furnishings or roof tiles, to have fire retardant properties. To this end, the present inventions include structures and products formed from the materials and processes describe above.

It will be appreciated that the present inventions prevent, limit and/or reduce combustion of the matrix from which the sections are made, thereby preventing the spread of a fire whilst limiting damage to, for example, the structural integrity of the sections.

In preferred embodiments, one or more faces of the fire retardant material products may have a profiled surface. For example, one or more faces may have a profiled surface formed by a moulding technique, the use of which is described above. In this way, an aesthetic effect may be produced, which allows for use of the materials for commercial and/or domestic applications. In addition, the function of the material may be disguised for aesthetic or security reasons.

In some examples, the fire retardant material may be moulded, extruded, pressed or otherwise processed into the form desired, such as a panel.

The term panel as used in the present application is intended to include panels which may be used to construct walls, floors, doors and/or ceilings. The panels may be modular in that they may be used with other panels (either those in accordance with the present invention or other suitable panels) to form walls, floors, doors and/or ceilings. It will be appreciated that the terms wall, floors and/or ceilings is intended to incorporate both load and non-load bearing structures. For example, the walls may be partitions such as used in large office buildings or cladding to cover existing structures. Likewise, the ceiling may be a false/hung ceiling such as found in many buildings.

In other examples, the fire retardant material may be moulded, extruded and/or machined or otherwise processed into the form of other common household or office objects, such as at least part of a table, at least part of a chair, a vase, shelves or at least part of a cupboard.

In yet other examples, the fire retardant material may be used to form roofing tiles and/or membranes such as those described above.

In another embodiment, the present invention is directed to the use of any of the gas-producing materials discussed above in suppressing or impeding the spread of a fire.

The present invention will now be described by way of example and with reference to the accompanying drawings in which.

Figure 1:
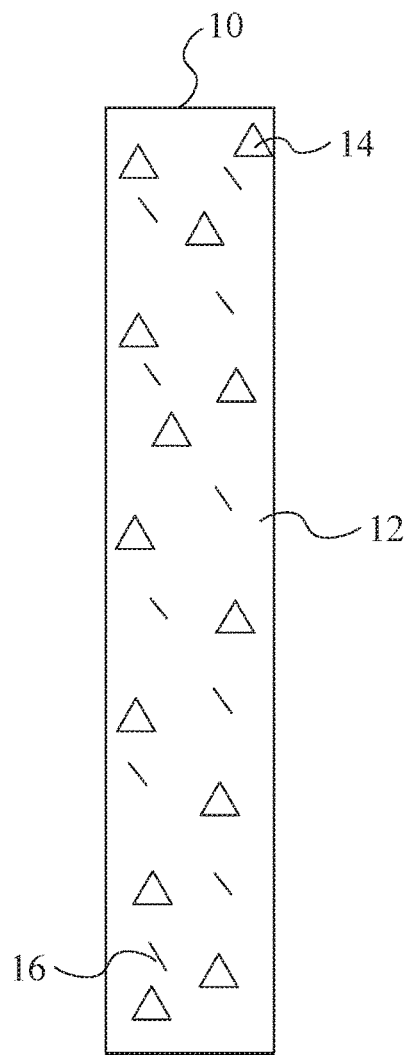
FIG. 1 is a diagrammatic cross-section of a fire retardant material in accordance with the present invention, wherein the gas-producing material is homogeneously distributed throughout the matrix.
Figure 2:
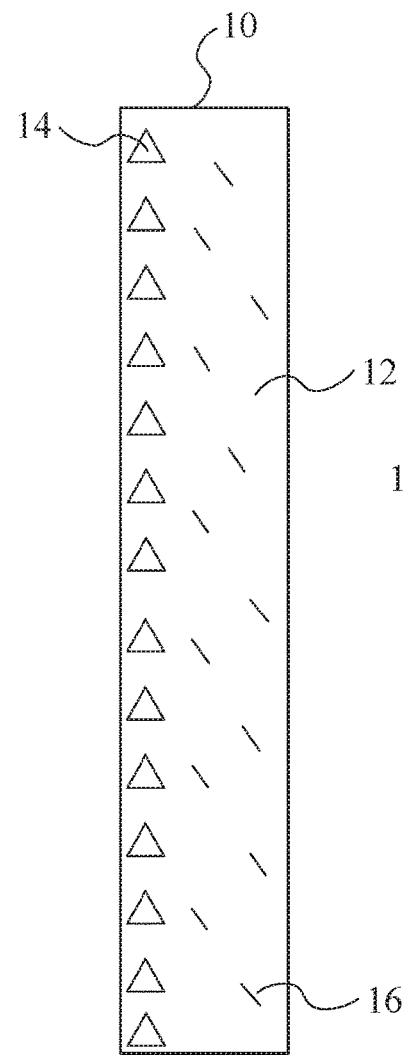
FIG. 2 is a diagrammatic cross-section of a fire retardant material in accordance with the present invention, wherein one side of the matrix contains a higher concentration of gas-producing material.
Figure 3:
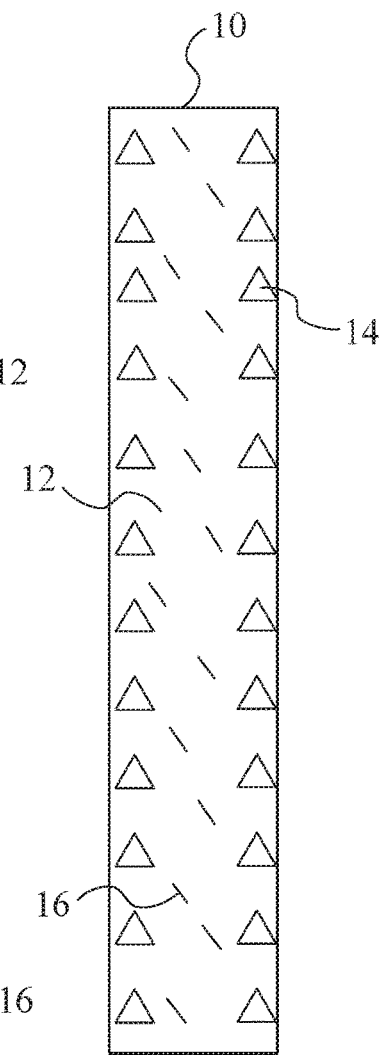
FIG. 3 is a diagrammatic cross-section of a fire retardant material in accordance with the present invention, wherein the gas-producing material is at a higher concentration around the periphery of the polymer matrix.

Looking at FIGS. 1 to 3, there is a fire suppression material (10) comprising a matrix (12) and a gas-producing material (14).

In the present example, the matrix (12) is a polymer, such as polyurethane. A gas-producing material (14) is admixed with the polymer matrix (12). In the present example, the gas-producing material (14) has been admixed with the polymer matrix (12) whilst the polymer matrix is in a liquid state.

In the example of FIG. 1, the fire retardant material is in the form of a film or sheet.

It can be seen that the gas-producing material is distributed homogeneously throughout the polymer matrix, as shown in FIG. 1.

Alternatively, the gas-producing material (14) may be applied to a surface of a mould, preferably an aluminium mould. A layer of sheet-form polymeric matrix material (12) may then be applied to the mould covering the gas-producing material (14). Upon applying pressure to the layers (such as described above), the gas-producing material (14) becomes embedded in the surface of the polymer matrix (12). The fire retardant material resulting comprises a polymer matrix (12) having a higher concentration of gas-producing material (14) at one surface (as shown in FIG. 2).

Alternatively, a layer of sheet-form polymer matrix material (12) can be applied directly to the mould surface, and a gas-producing material (14) subsequently applied on top of the sheet-form polymer matrix material. Upon the application of pressure to the layers the gas-producing material (14) becomes embedded in the matrix material (12).

In a further alternative method, the gas-producing material is applied both directly to the surface of the mould and on top of the sheet-form polymer matrix material (12) before the application of pressure. In this way, the resulting fire retardant material comprises a polymer matrix material (12) containing gas-producing material (14) around the periphery of the polymer matrix.

The fire retardant materials of FIGS. 1 to 3 further comprise fibers (16) located within the polymer matrix (12) so as to increase the strength and rigidity of the structure. It will be appreciated that such fibres can be provided in the form of a layer within the polymer matrix material (12) and may be woven or non-woven such as described above. Such disclosure is particularly relevant to the use of SMC, again as described above.

Figure 4:
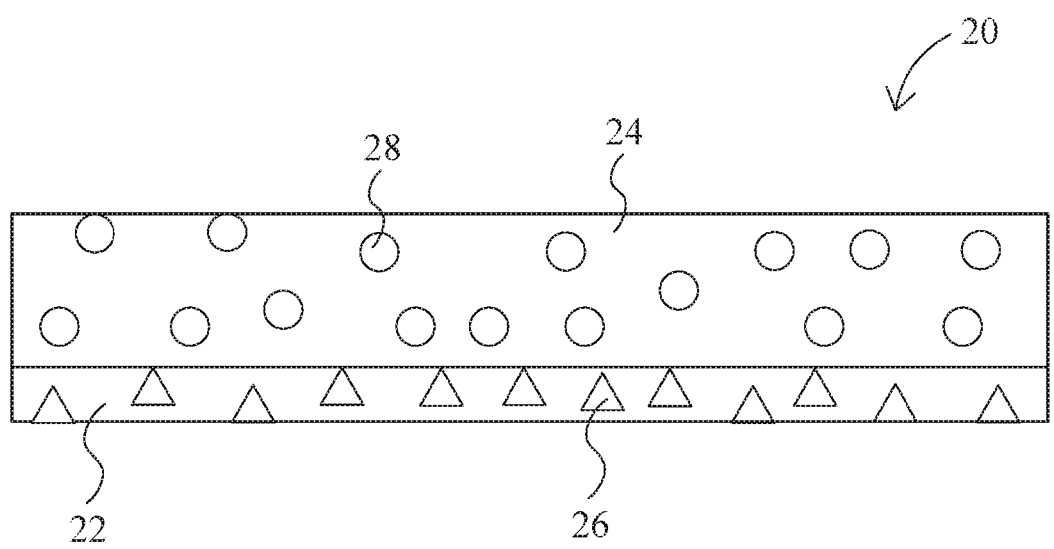
FIG. 4 is a diagrammatic cross-section of a composite material for use in fire suppression in accordance with the present invention.

FIG. 4 illustrates a composite (20) comprising a sheet-form polymeric material (22) and a substrate (24), wherein the sheet-form material is preferably sheet moulding compound (SMC).

The matrix layer (22) is admixed with the gas-producing material (26), wherein admixing has been performed as described above. The substrate (24) is a foamed phenolic resin, which is open-cell (28) in nature.

Figure 5:
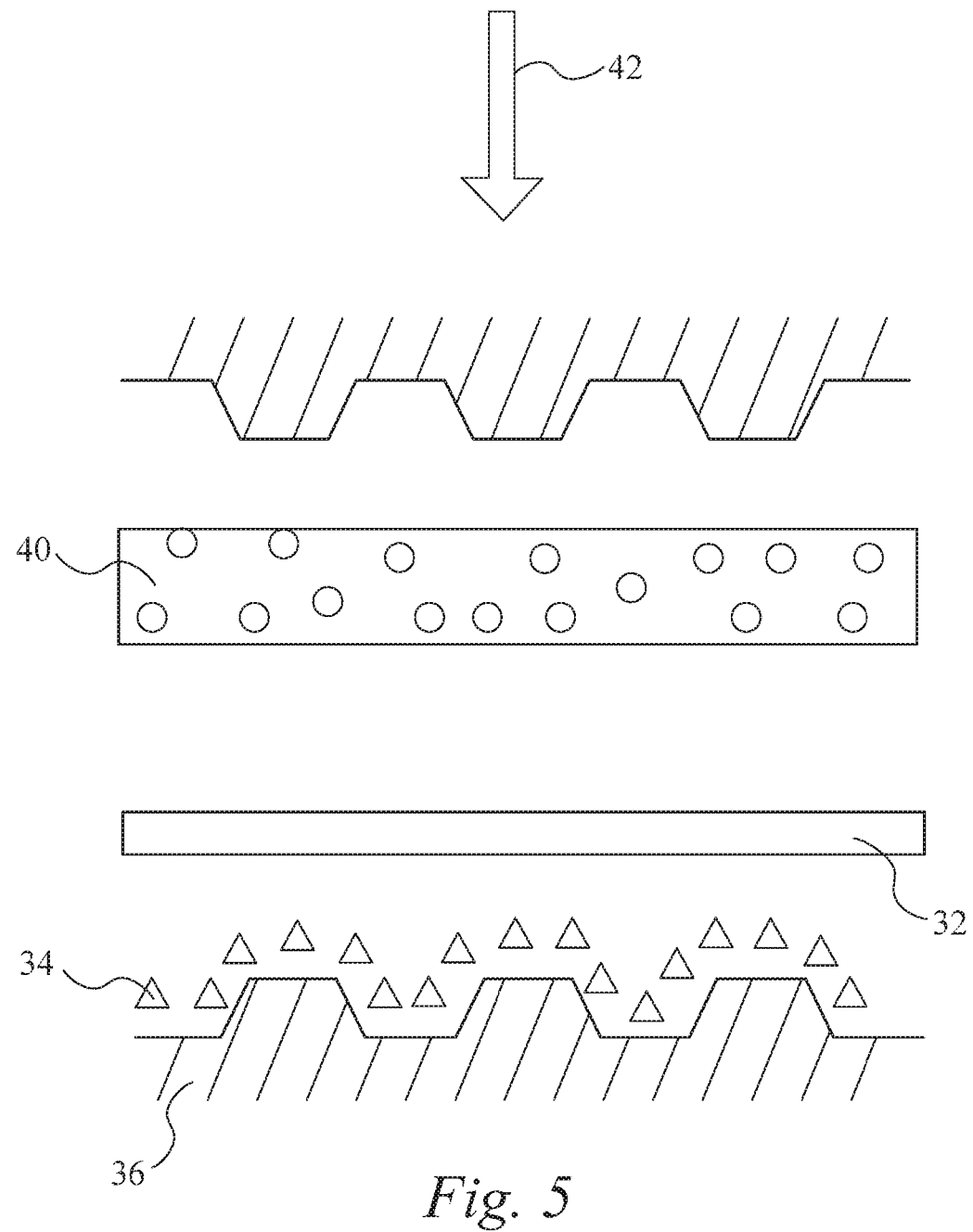
FIG. 5 is a diagrammatic representation of the layers present when moulding a composite material in accordance with the present invention.

The composite of FIG. 4 may be prepared using a method such as shown in FIG. 5 and as described below. In FIG. 5, a layer of sheet-form polymer matrix material (32) is applied to a surface of a mould (36) over a gas-producing material (34), which material is pre-applied to the mould as a first step (it will be appreciated that the layer of polymer matrix material could be pre-mixed with the gas-producing material and applied as a single layer of mixed material). The sheet-form polymer matrix (32) is preferably sized so as to extend across the whole area of the mould surface (36).

It will be appreciated that in FIG. 5 and in other of the figures the shapes of the components are shown schematically. In particular, the relative thicknesses of the elements are not shown to scale. For the present example, the preferred thickness of the matrix layer is about 1 mm whereas the thickness of the substrate is about 5 cm.

A block of open-celled foam substrate (40) (in the present example, the foam used has a cell size range of 0.5 to 3 mm and a density of 100 to 500 kg/m$^3$) is placed on the sheet-form polymer matrix material (32) (again, it will be appreciated that the layers could be applied in the reverse order). The materials are then pressed and preferably heated (42), so as to produce a monolithic composite structure. The heating is preferably to a temperature greater than about 100° C., preferably greater than 120° C.

By using an open-cell foam, it is possible for the sheet-form polymer matrix material to flow into the open-cells of the substrate thereby forming a strong bond. In addition, the heating of the mould can be used to commence the curing process of the sheet-form polymer matrix material (32), and therefore the process also may comprise the step of causing or allowing the material to cure.

In addition, although not shown, the process may comprise the step of providing a veil between the matrix material and a surface of the mould. It will be appreciated that where gas-producing material is placed on the mould, the veil is preferably between the matrix material and the gas-producing material, and the mould, so as to provide a smooth surface finish. Preferably, the veil is substantially pervious to a component of the polymer matrix during the moulding.

In addition, although not shown, a further layer of polymeric matrix material may be applied to an opposing surface of the substrate, the application of pressure sandwiching the substrate between the two layers of material.

The polymeric matrix material may include reinforcing fibres, such as a mat, fabric of fibres, a mesh or network of fibres. By way of example, the polymeric matrix material may comprise one or more of carbon fibres, glass fibres and aramid fibres.

As noted above, in a preferred embodiment, the polymeric matrix material comprises SMC (sheet moulding compound).

Whichever polymeric matrix material is chosen, it is preferable for the viscosity of the material to reduce during the pressing step.

In the example described herein, the polymeric material is applied as a substantially single thickness. It will however be appreciated that multiple layers could be used.

Further, where required, additional layers of reinforcing fibres can be included between the substrate and the layer of polymeric matrix material.

In the process shown in FIG. 5, near the heated mould surface (36), the SMC begins to liquefy and flows into cells at the surface of the substrate (40) as well as around the preformed gas-producing material.

Air and other gases trapped between the SMC layer (32) and the substrate (40) passes through the open cell structure of the foam. The components may be held in the mould for a sufficient time for the SMC to cure for form a hard, cured skin bound to the moulded substrate.

In FIG. 5, both an upper and lower portion of the mould (36) are profiled, however it is not essential for there to be any shaping to the mould, and thus press plates and/or heated press plates will suffice.

Gas Producing Material Examples

A series of measurements on the reaction smoke generated from three types of gas-producing material were conducted. The three types of gas-producing material were:

A. "Prior Art Material with catalyst" comprising potassium nitrate, phenol-formaldehyde resin, toluenesulfonic acid, dicyandiamide B. "Prior Art Material without catalyst" comprising Potassium Nitrate, phenol-formaldehyde resin, dicyandiamide C. "Inventive Material" comprising: potassium nitrate, dicyandiamide, comminuted foamed phenol-formaldehyde resin The prior art materials are marketed by Villanova and sold as part of a product known as 'Firestryker'. The "Prior Art Material with catalyst" comprises, by total weight of the composition, potassium nitrate in an amount of 60%, phenol-formaldehyde resin in an amount of 13.73%, toluenesulfonic acid in an amount of 1.29%, dicyandiamide in an amount of 23.46% and water in an amount of 0.86%.

The evaluation of the reaction smoke generated from the three types of gas-producing material was carried out for a period of two hours inside a closed cabin of a volume of 7.7 m3. For the "Prior Art Material without catalyst", three charges, each weighing 50 kg, were combusted over a period of two hours. The charges were ignited at intervals of 40 minutes, i.e. the first charge was ignited at the beginning of the two hour period, the second charge 40 minutes into the period, and the third charge an hour and twenty minutes into the period. For the "Prior Art Material with catalyst" and the "Inventive Material", four charges, each weighing 50 kg, were combusted over two hours. The charges were ignited at intervals of 30 minutes, i.e. the first charge was ignited at the beginning of the two-hour period, the second charge 30 minutes into the period, the third charge an hour into the period, and the final charge an hour and a half into the period.

Measurement probes were located inside a small hole inside the cabin.

Measurements were taken on the following pollutants:

Combustion gas: CO, NOx, SOx (like SO2), O2

Phenol

Formaldehyde

Ammonia

Total cyanide (Hydrogen cyanide and salt)
Hydrogen sulfide
Polynuclear aromatic hydrocarbons
Analytic Methods Measurements relating to the combustion gas pollutants were carried out for a period of 20 minutes after combustion of the first charge. All other measurements were carried out for the duration of the two hour period.
Combustion Gas: CO, NOx, SOx (like SO2), O2

The combustion parameters were measured continuously. A portable meter HORIBA with NDIR detection system was used for measuring CO and SO2, chemiluminescence was used for measuring NOx, and paramagnetism was used for measuring O2
Total Cyanide (Hydrogen Cyanide and Salt)—UV-VIS—Inner Method (Rif. Met. Uff. MU 2251:2008+ISO 6703-2: 1984)

Hydrogen cyanide measurements were conducted using NaOH water solutions as measuring supports. The NaOH solutions were contacted with pyridine and barbituric acid, and then analysed using US-VIS spectrophotometry at a wavelength of 578 nm.
Phenol—GC-MS—Met. Uff. NIOSH 2546 1994

Phenol measurements were conducted using XAD-7 solid sorbent tubes as measuring supports. The solid sorbent tubes were eluted with methanol. Analysis was carried out using a gas chromatography mass detection system.
Formaldehyde—HPLC-UV—Met. Uff. NIOSH 2016 1998

Formaldehyde measurements were conducted using cartridges containing silica gel coated with 2,4-dinitrophenylhydrazine as measurement supports. The cartridges were eluted with a solution of acetonitrile for HPLC. Analysis was carried out using liquid chromatography at high pressure (HPLC-UV) with a UV-VIS detecting system.
Polynuclear Aromatic Hydrocarbons—GC-MS—Met. Uff. NIOSH 5515 1994

Measurements were conducted using XAD-2 vials in series with glass fiber filters as measurement supports. The filters and vials were eluted in a hexane-acetone mixture. The obtained solutions were analyzed using a gas chromatography mass detection system.
Ammonia—UV-VIS—Met. Uff. NIOSH 6015 1994

Ammonia measurements were conducted using solid sorbent tubes with silica gel activated with sulfuric acid as measurement supports. The supports were eluted with a solution of ultrapure water. The obtained solutions were analyzed with UV-VIS spectrophotometry.
Hydrogen Sulfide—IC—Met. Uff. NIOSH 6013 1994

Hydrogen sulfide measurements were conducted using solid sorbent tubes with coconut shells as measurement supports. The solid sorbent tube were eluted with a solution of NaOH. The obtained solution was analyzed using ionic chromatography.

A glass fiber filter was used for the measurements that require the use of a solid sorbent tube, so as to avoid the packing of the absorbent layer by particulate matter produced during combustion. The filter was also analysed.
Results
Combustion gas: CO, NOx, SOx (like SO2), O2:

The measurements do not show any important differences between the combustion gases omitted by gas-producing materials. The combustion gases were produced in similar amounts by each material, except for NOx and CO which were produced in slightly slower amounts by the "Prior Art Material with catalyst".

| Sample | | 12SP0234-002 | 12SP0234-023 | 12SP0234-034 |
|---|---|---|---|---|
| Typology | | Without Catalyst | Own Production Extinguisher | Milan Extinguisher |
| Emission Date | | 17 Feb. 2012 | 17 Feb. 2012 | 17 Feb. 2012 |
| Parameter | U.M. | Value | Value | Value |
| CO | mg/m3 | 100.5 | 86.9 | 108.3 |
| NOx (come NO2) | mg/m3 | 29.4 | 26.3 | 29.11 |
| O2 | % | 20.8 | 20.8 | 20.8 |
| SO2 | mg/m3 | 7.5 | 8.1 | 9.2 |

Phenol:

The "Prior Art Material without catalyst" produced less phenol on combustion than the other materials. The absence of a toluenesulfonic acid catalyst used for crosslinking of the phenol-formaldehyde resin during preparation of the "Prior Art Material without catalyst" meant that cross-linking was carried out for a longer time, thereby allowing unreacted phenol to disperse into the atmosphere. Thus, there is less phenol to be released on combustion of the "Prior Art Material without catalyst". As the resin in the "Inventive Material" is pre-foamed, the phenol has had some time to disperse from the foam into the atmosphere. Thus, the resin can be considered "old" in comparison to the resin used in the "Prior Art Material with catalyst".

| Sample | | 12SP0234-002 | 12SP0234-023 | 12SP0234-034 |
|---|---|---|---|---|
| Typology | | Without Catalyst | Own Production Extinguisher | Milan Extinguisher |
| Emission Date | | 15 Feb. 2012 | 21 Feb. 2012 | 21 Feb. 2012 |
| Parameter | U.M. | Value | Value | Value |
| Phenol | mg/m3 | 0.066 | 31 | 4.8 |

Formaldehyde:
The formaldehyde values are low in each of the gas-producing materials.

| Sample | | 12SP0234-006 | 12SP0234-024 | 12SP0234-035 |
|---|---|---|---|---|
| Typology | | Without Catalyst | Own Production Extinguisher | Milan Extinguisher |
| Emission Date | | 15 Feb. 2012 | 21 Feb. 2012 | 21 Feb. 2012 |
| Parameter | U.M. | Value | Value | Value |
| Formaldehyde | mg/m3 | <0.006 | <0.006 | <0.006 |

Ammonia:
The ammonia values are similar in the three types of material, taking into account the quantities of charges used for the test and the nature of the analyses.

| Sample | | 12SP0234-003 | 12SP0234-021 | 12SP0234-019 |
|---|---|---|---|---|
| Typology | | Without Catalyst | Own Production Extinguisher | Milan Extinguisher |
| Emission Date | | 15 Feb. 2012 | 21 Feb. 2012 | 21 Feb. 2012 |
| Parameter | U.M. | Value | Value | Value |
| Ammonia | mg/m3 | 0.5173 | 1.03 | 1.77 |

Polynuclear Aromatic Hydrocarbons:
The results show that polynuclear aromatic hydrocarbons are produced from organic components in the materials during combustion. The "Inventive Material" generated, on average, smaller quantities of polynuclear aromatic hydrocarbons compared to the other two materials. Without wishing to be bound by any theory, it is believed that the smaller quantities measured could be as a result of the higher combustion temperature of the "Inventive Material" causing greater decomposition of the polynuclear aromatic hydrocarbons.

| Sample | | 12SP0234-004 | 12SP0234-021 | 12SP0234-031 |
|---|---|---|---|---|
| Typology | | Without Catalyst | Own Production Extinguisher | Milan Extinguisher |
| Emission Date | | 15 Feb. 2012 | 21 Feb. 2012 | 21 Feb. 2012 |
| Parameter | U.M. | Value | Value | Value |
| Naphthalene | Ng/m3 | 786 | 16861 | 10180 |
| Acenaphthylene | Ng/m3 | 1099 | 6789 | 5837 |
| Acenaphthene | Ng/m3 | 292 | 58.3 | 257 |
| Fluorene | Ng/m3 | 484 | 1669 | 790 |
| Phenanthrene | Ng/m3 | 4054 | 14169 | 4940 |
| Anthracene | Ng/m3 | 877 | 2494 | 820 |
| Fluoranthene | Ng/m3 | 1434 | 3269 | 1150 |
| Pyrene | Ng/m3 | 614 | 1267 | 533 |
| Benzo(a)anthracene | Ng/m3 | 801 | 1744 | 340 |
| Chrysene | Ng/m3 | 1386 | 2633 | 417 |
| Benzo(b)fluoranthene | Ng/m3 | 451 | 764 | 185 |
| Benzo(k)fluoranthene | Ng/m3 | 437 | 569 | 207 |
| Benzo(a)pyrene | Ng/m3 | 412 | 1392 | 453 |
| Benzo(e)pyrene | Ng/m3 | 376 | 828 | 263 |
| Perylene | Ng/m3 | 43.3 | 103 | 23.3 |
| Indeno(1,2,3-cd)pyrene | Ng/m3 | 94.4 | 133 | 33.3 |
| Dibenz(a,h)anthracene | Ng/m3 | 141 | 211 | 36.7 |
| Benzo(g,h,i)perylene | Ng/m3 | 274 | 408 | 61.7 |
| Dihenz(a,l)pyrene | Ng/m3 | 83.3 | 283 | 40 |
| Dibenz(a,e)pyrene | Ng/m3 | 82.2 | 161 | 25.3 |
| Dibenz(a,i)pyrene | Ng/m3 | 45 | 150 | 20.7 |
| Dibenz(a,h)pyrene | Ng/m3 | 25.6 | 72.2 | 18 |

Hydrogen Sulphide:

The "Prior Art Material without catalyst" produced a minor amount of hydrogen sulfide (H2S), very likely due to the absence of toluenesulfonic acid used as a catalyst. The "Inventive Material" produced more hydrogen sulphide than the "Prior Art Material with catalyst". This is somewhat expected from given the relative amounts of sulphur present in the mixtures before combustion, shown below along with the amounts of certain other components.

| Sample | | 12SP0234-005 | 12SP0234-020 | 12SP0234-030 |
|---|---|---|---|---|
| Typology | | Without Catalyst | Own Production Extinguisher | Milan Extinguisher |
| Emission Date | | 15 Feb. 2012 | 21 Feb. 2012 | 21 Feb. 2012 |
| Parameter | U.M. | Value | Value | Value |
| Hydrogen sulfide (H2S) | mg/m3 | 0.394 | 1.096 | 1.841 |

| Sample | | | 12SP0234-016 | 12SP0234-017 | 12SP0234-018 |
|---|---|---|---|---|---|
| Typology | | | Without Catalyst | Own Production Extinguisher | Milan Extinguisher |
| Emission Date | | | 21 Feb. 2012 | 21 Feb. 2012 | 21 Feb. 2012 |
| Parameter | U.M. | Limit | Value | Value | Value |
| Total Bromine | % | — | <0.01 | <0.01 | <0.01 |
| Total Chlorine | % | — | 0.09 | 0.16 | 0.11 |
| Total Fluorine | % | — | 0.01 | 0.02 | 0.02 |
| Total Iodine | % | — | <0.01 | <0.01 | <0.01 |
| Total Sulphur | % | — | 0.02 | 0.1 | 0.35 |

Total Cyanide (Hydrogen Cyanide and Salt):

A large difference can be seen between the cyanide produced on combustion of the "Inventive Material" and the prior art materials. The "Inventive Material" emits an amount of cyanide that is over ten times smaller than that emitted by the prior art materials, thereby allowing a much greater amount of gas-producing material to be used per unit of confined space. Without wishing to be bound by any theory, it is believed that small value observed in connection with the "Inventive Material" could be attributable to a higher temperature of combustion i.e. over 1000° C. versus less than 800° C.

| Sample | | 12SP0234-007 | 12SP0234-019 | 12SP0234-019 |
|---|---|---|---|---|
| Typology | | Without Catalyst | Own Production Extinguisher | Milan Extinguisher |
| Emission Date | | 15 Feb. 2012 | 21 Feb. 2012 | 21 Feb. 2012 |
| Parameter | U.M. | Value | Value | Value |
| Total Cyanide (HCN and Salt) | mg/m3 | 76.7 | 48.4 | 3.16 |

As can be seen from the experimental evidence, the gas-producing materials are suitable for suppressing fire, particularly in confined spaces where the potential accumulation of unwanted by-products can be harmful to humans. The results also show that the use of a comminuted foamed polymer leads to a reduction in cyanide emissions from a gas-producing material comprising a nitrogen-containing fuel and an oxidiser.

Examples of Fire Retardant Materials

Procedure

The flame retardant abilities of the composite materials described above were tested by heating one side of the material with a flame for 30 seconds followed by a rest period of 20 seconds, wherein the material was not heated. The process of heating the composite material and rest periods was repeated thirteen times sequentially. Each panel tested had a thickness of 9 mm.

1. A panel formed of SMC and alumina

A panel comprising 100 parts resin to 150 parts alumina was formed. The fire retardant properties of a panel formed from SMC and alumina was tested as described above. After being exposed to thirteen cycles of heating with a flame and resting, fire damage was observed throughout the panel, with the flame having burnt through from one side of the panel to the other.

2. A panel formed of an SMC layer containing 130 parts alumina and 20 parts of ground phenolic foam.

A panel comprising 100 parts resin, 130 parts alumina and 20 parts of ground phenolic foam was formed. After being exposed to thirteen cycles of heating and resting, fire damage was observed throughout the panel, the flame having burnt through from one side to the other. However, it was observed that the time required for the fire to burn through the panel was three times longer compared to the panel of Example 1.

3. A panel formed of an SMC layer containing 130 parts alumina and 20 parts of the gas producing material described and exemplified above.

A panel comprising 100 parts resin, 130 parts alumina and 20 parts gas producing material was formed. Upon exposing the panel to a flame, it was observed that the fire retarding material of the invention was able to extinguish the flame within 14 seconds of being exposed, for each of the thirteen cycles within the test. In this way, there was no significant ingress of the flame into the panel, and therefore the panel remained substantially intact after the testing was completed.

The results above clearly demonstrate significant advantages in using the fire retardant materials of the present inventions, without which resulted in serious fire damage.

The invention claimed is:

1. A fire retardant material comprising a preformed gas-producing material admixed with a matrix, wherein the preformed gas-producing material comprises:
   a) a comminuted foamed polymer;
   b) a nitrogen-containing fuel; and
   c) an oxidiser.

2. A fire retardant material according to claim 1, wherein the comminuted foamed polymer of the preformed gas-producing material is selected from at least one member of a group consisting of phenolic resin foams, polystyrene foams, polyurethane foams, polyvinylchloride foams, polyester foams, polyether foams, and foam rubber.

3. A fire retardant material according to claim 1, wherein the comminuted foamed polymer of the preformed gas-producing material is open-cell.

4. A fire retardant material according to claim 1, wherein the nitrogen-containing fuel of the preformed gas-producing material is selected from at least one member of a group consisting of guanidine salts, triazoles, tetrazoles, and azo-compounds.

5. A fire retardant material according to claim 1, wherein the oxidiser of the preformed gas-producing material is selected from at least one member of a group consisting of alkali metal nitrates, perchlorates, and carbonates.

6. A fire retardant material according to claim 1, wherein the preformed gas-producing material comprises the comminuted foamed polymer, the nitrogen-containing fuel, and the oxidiser in the following amounts:
   comminuted foamed polymer between about 5 to 35% by weight;
   nitrogen-containing fuel between about 5 to 45% by weight; and
   oxidiser between about 30 to 75% by weight.

7. A fire retardant material according to claim 1, wherein the comminuted foamed polymer, the nitrogen-containing fuel, and the oxidiser of the preformed gas-producing material are in particulate form.

8. A fire retardant material according to claim 7, further comprising at least one member of a group consisting of comminuted foam polymer having an average particle size of 1 to 200 µm, nitrogen-containing fuel having an average particle size of 5 to 150 µm, and oxidiser having an average particle size of 1 to 100 µm.

9. A fire retardant material according to claim 7, wherein the mixture of the comminuted foamed polymer, the nitrogen-containing fuel, and the oxidiser particles are in an aggregated form.

10. A fire retardant material according to claim 1, wherein at least 60 wt % of the preformed gas-producing material is the comminuted foamed polymer, the nitrogen-containing fuel, and the oxidiser.

11. A fire retardant material according to claim 1, wherein the matrix is a polymeric material or a bitumous material.

12. A fire retardant material according to claim 11, wherein the polymeric material is selected from at least one member of a group consisting of a brominated polymer, polyethylene, polyimide, polyurethane, polybenzimidazole, polybenzoxazole, polybenzthiazole, polysialate, and a phenolic resin.

13. A fire retardant material according to claim 11, wherein the bitumous material is based on at least one member of a group consisting of atactic polypropylene (APP), amorphous poly alpha olefin (APAO), thermoplastic polyolefin (TPO), styrene-butadiene-styrene (SBS), styrene-ethylene-butadiene-styrene (SEBS), and synthetic rubber.

14. A fire retardant material according to claim 1, wherein the matrix further comprises at least one fire suppressant selected from at least one member of a group consisting of bismuth, antimony, antimony trioxide, chlorinated paraffins, brominated polymers, phosphoric acid esters, polyphosphoric acid ammonium, magnesium hydroxide, aluminium hydroxide, and zinc borates.

15. A fire retardant material according to claim 1, wherein the preformed gas-producing material is admixed with the matrix in amounts of up to 85% by weight of the matrix.

16. A fire retardant material according to claim 1, wherein the preformed gas-producing material is present in a homogeneous distribution throughout the matrix.

17. A fire retardant composite comprising a substrate bonded to a layer of polymeric material, and further comprising a preformed gas-producing material, admixed with the polymeric material and/or the substrate;
   wherein the preformed gas-producing material comprises a comminuted foamed polymer, a nitrogen-containing fuel, and an oxidiser.

18. A fire retardant composite according to claim 17, wherein the preformed gas-producing material is within the matrix of the polymeric material and the substrate.

19. A composite material according to claim 17, wherein the polymeric material is a sheet moulding compound (SMC).

20. A composite material according to claim 17, wherein the preformed gas-producing material is homogeneously distributed throughout the polymeric material.

21. A composite material according to claim 17, wherein the substrate is a foamed polymer resin selected from at least one member of a group consisting of phenolic resin foams, polystyrene foams, polyurethane foams, polyvinylchloride foams, polyester foams, polyether foams, and foam rubber.

22. A composite material according to claim 21, wherein the preformed gas-producing material is present within the matrix of the polymeric material.

23. A wall panel, ceiling panel, floor panel, cladding, or partition panel comprising a fire retardant material comprising a preformed gas-producing material admixed with a matrix, wherein the preformed gas-producing material comprises a comminuted foamed polymer, a nitrogen-containing fuel, and an oxidiser.

24. A table, chair, vase, shelves, cupboard, or part thereof, comprising a fire retardant material comprising a preformed gas-producing material admixed with a matrix, wherein the preformed gas-producing material comprises a comminuted foamed polymer, a nitrogen-containing fuel, and an oxidiser.

25. A tile comprising a fire retardant material comprising a preformed gas-producing material admixed with a matrix, wherein the preformed gas-producing material comprises a comminuted foamed polymer, a nitrogen-containing fuel, and an oxidiser.

* * * * *